United States Patent
Rey

(10) Patent No.: US 11,888,963 B1
(45) Date of Patent: Jan. 30, 2024

(54) FRAME SYNCH DETECTION WITH RATE ADAPTATION

(71) Applicant: Cypress Semiconductor Corporation, San Jose, CA (US)

(72) Inventor: Claudio Rey, Chandler, AZ (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/876,194

(22) Filed: Jul. 28, 2022

(51) Int. Cl.
*H04L 7/033* (2006.01)
*H04L 7/00* (2006.01)
*H04L 7/04* (2006.01)

(52) U.S. Cl.
CPC .......... *H04L 7/0331* (2013.01); *H04L 7/0041* (2013.01); *H04L 7/042* (2013.01)

(58) Field of Classification Search
CPC ..... H04L 7/042; H04L 7/0079; H04L 7/0087; H04L 7/0041; H04L 7/0331; H04L 7/0016; H04B 1/16
See application file for complete search history.

(56) References Cited

U.S. PATENT DOCUMENTS

| | | | | |
|---|---|---|---|---|
| 7,583,771 B2* | 9/2009 | Zweigle | ................ | H04L 7/0054 |
| | | | | 375/355 |
| 8,831,070 B2* | 9/2014 | Huang | .................... | H04L 7/042 |
| | | | | 375/150 |
| 10,404,490 B2* | 9/2019 | Dutz | ....................... | H04L 7/042 |

* cited by examiner

*Primary Examiner* — Betsy Deppe

(57) ABSTRACT

A device includes a receiver to receive a packet over a channel at a first frequency and generate a sampled stream of data at a first sample rate corresponding to the first frequency. A data resampler circuit includes a re-timer engine to determine, using a fractional rate between the first sample rate and a crystal oscillator (XO)-divided sample rate, re-timer values including a difference between pulses of a pseudo clock corresponding to the XO-integer-divided sample rate and closest corresponding pulses of a clock corresponding to the first sample rate. The data resampler circuit includes a time shifting circuit to re-sample data values of the sampled stream of data associated with locations of the plurality of re-timer values. A correlation circuit uses the re-sampled data values, pseudo clock, and the re-timer values to match an expected data pattern to a corresponding data pattern detected in a frame delimiter of the packet.

20 Claims, 8 Drawing Sheets

FRAME SYNCH DETECTION WITH RATE ADAPTATION

TECHNICAL FIELD

This disclosure relates to wireless networks and, more specifically, to frame synch detection with rate adaptation between wireless devices.

BACKGROUND

Personal area networks (PANs), such as Bluetooth® (BT), Bluetooth® Low Energy (BLE), Zigbee®, infrared, and the like provide wireless connection for various personal, industrial, scientific, and medical applications. PANs generally use a packet-based protocol and have an architecture that includes central devices (CDs) and peripheral devices (PDs). A CD can communicate with multiple PDs.

Some PANs, such as based on BLE technology, have communication ranges that are similar to those of BT networks but have a considerably smaller power consumption and cost. Further, BLE devices often remain in a sleep mode and transition to an active mode when data communication is about to happen. BLE protocol also supports mesh networking, in which data can flow over multiple paths, and which does not rely on a rigid hierarchical structure of devices, often allowing the same devices to serve as CDs or PDs, depending on particular network conditions and topology.

Additionally, some PANs are used in wireless devices (e.g., CDs) that are included in or associated with lock mechanisms of enclosures (such as a residence, a vehicle, a garage, shed, or the like) and used to provide secure keyless access to persons in possession of a keyed PD, e.g., also referred to as keyless entry. A keyed PD (which could be a mobile device such as a smartphone, for example) may transmit a particular data pattern within a frame delimiter of a packet. The wireless CD device associated with an enclosure may then perform frame synch detection to verify that the particular data pattern matches an expected data pattern used to, in part, provide a level of security to the keyless entry.

DETAILED DESCRIPTION

Figure 1A:
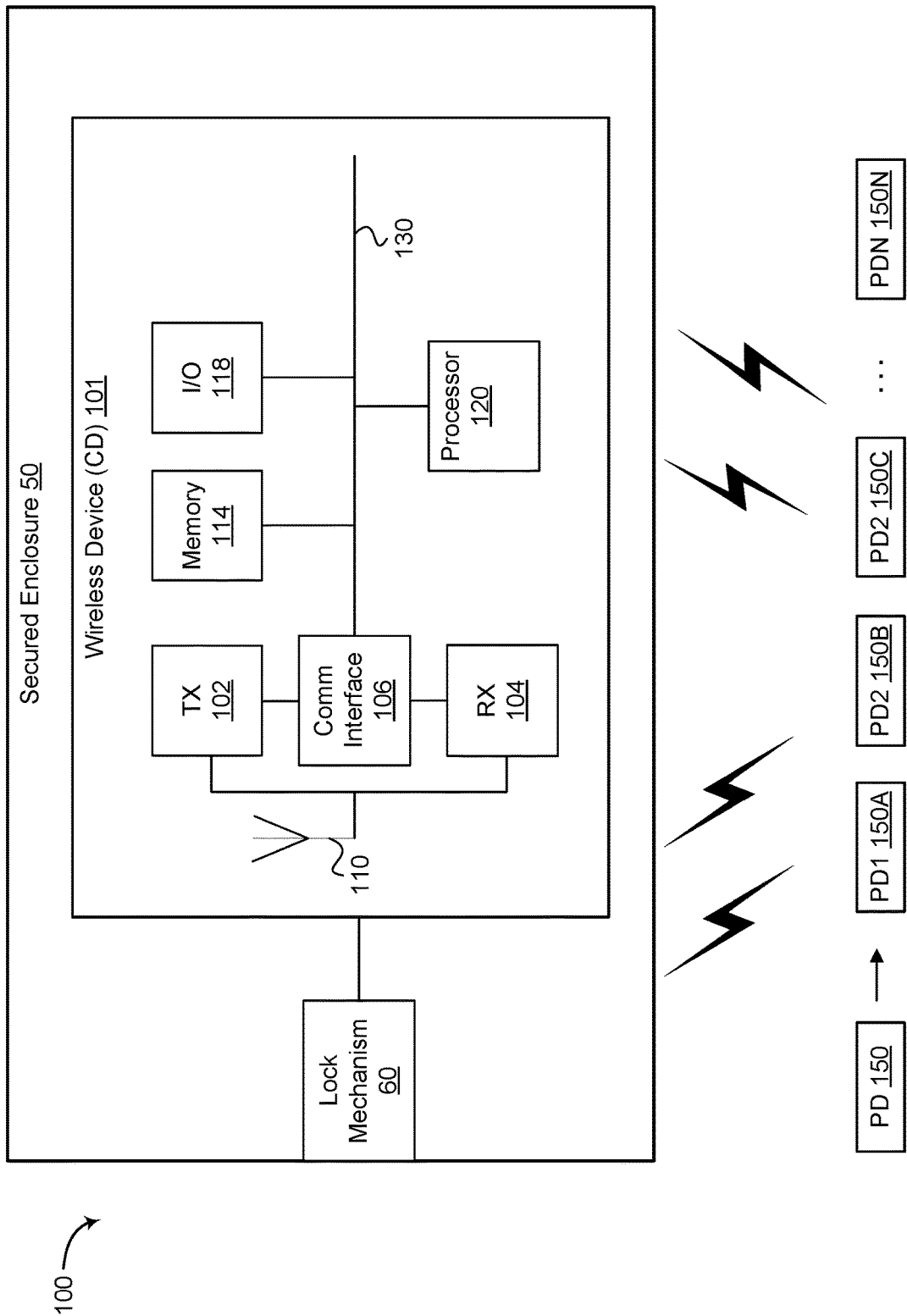
FIG. 1A is a block diagram of a system useable for frame synch detection with rate adaptation between a wireless device acting as a CD and a wireless device acting as a PD according to with an example embodiment.

The following description sets forth numerous specific details such as examples of specific systems, devices, components, methods, and so forth, in order to provide a good understanding of various embodiments of frame synch detection between wireless devices associated with a PAN. The disclosed principles may be generally applied to non-Gaussian Frequency Shift Keying (GFSK) modulation, even such modulations without frequency. Frame synchronization (or frame synch) detection may be understood as detecting a frame delimiter, also referred to as a start frame delimiter (SFD), in a network packet that is identifying or signaling that data is to follow within a frame of the packet. While this is the case, some packets may include a frame delimiter (or SFD) without a payload, particularly where the frame delimiter itself is initially employed for security purposes, e.g., in order to perform verification of a PD wireless device. Thus, the data of a packet referred to herein may refer to just a preamble and a frame delimiter or may also make reference to the frame or payload of data within the packet.

In certain PAN devices, frame synch detection may be employed intrinsically to estimate round trip timing (RTT), which may be used in BLE for positioning. One example of using positioning data is BLE high accuracy distance measurement (HADM) used for keyless entry, e.g., where a BLE device (such as a mobile phone) acts as a digital car key. For example, frame synch patterns as defined in BLE may be used to estimate RTT of packets to estimate a distance from an enclosure. Thus, HADM (and related approaches) may be understood as a phase-based ranging technique, which can be enriched with physical layer (PHY) security features, that create a secure distance measurement between two BT-enabled devices. While BLE is one example of a protocol that uses frame synch detection, frame synch detection may also be applicable in other contexts or protocols where distance estimation for performing ranging or localization might be desired.

Frame synch detection is best carried out at a sample rate that is a simple multiple, e.g., 4, 6, 12 or the like of the data symbol rate, typically 1 or 2 megabits per second (Mbps), where these rates are typically a divided (or sampling) rate of the crystal oscillator (XO) frequency which is, e.g., 24 megahertz (MHz), 32 MHz, or 48 MHz. The subsequent processing of the data symbols may be straight-forward in being performed at known XO-integer-divided sample rates and synch data patterns (e.g., of digital "0s" and "1s") can be more easily correlated using bit decisions according to Boolean logic. Alternatively, signed soft symbols may be used to obtain more accurate results in which case the correlation can be described as a number of summations and subtractions. Thus, in practice, a time of arrival (ToA) estimate of synch frames is as accurate as the closest edge of a receiver clock (coarse timing) or as accurate as a fraction of a period of the receiver clock (fractional timing). Some deficiencies of this approach include that receivers that operate at XO-integer-divided sample rates experience significant radio interference issues, e.g., in the form of clock spurs, that cause receiver de-sensing, e.g., that impacts receiver sensitization.

Accordingly, to avoid these radio interference issues, the receiver of the wireless device can instead use a sample rate that is a divided from a local oscillator (LO) frequency. The LO frequency is most often (although not necessarily always) a non-multiple of the modulation bit rate, e.g., of an XO-integer-divided sample rate. While this approach avoids some receiver de-sensing issues, this solution also requires a rate adaptation between the LO frequency derived sample rates and XO-integer-divided sample rates. Such adaptation typically use a first-in-first-out (FIFO) buffer to transfer the data between domains. This solution is not entirely satisfactory, as ToA measurement requires a precise controllable latency through the FIFO buffer.

To resolve the deficiencies experienced with rate adaptations when resampling packets received at an LO-based (or original) sample rate to an XO-integer-divided sample rate, the FIFO buffer may be excluded. In this scenario, a data resampler circuit may create a clock using either pulse removal (e.g., swallowing) or pulse insertion that, on average, approximates a rate that is a multiple of the data symbol rate. An approximation of a desirable multiple of the data symbol rate may be, e.g., 8, 6, or 4× the data symbol rate and a divided XO rate. For example, the symbol rate may be at 1 MHz and the XO frequency used may be 24 MHz while the average rate approximates 6 MHz or the XO sample rate divided by 4. Thus, the XO-integer-divided sample rate may average a fraction of a frequency of an integer-divided XO sample rate. These values are provided only by way of example for purposes of explanation.

According to some embodiments, a receiver wirelessly receives a packet over a channel at a first frequency and generates a sampled stream of data from the packet at a first sample rate corresponding to the first frequency. In at least some embodiments, the data resampler circuit includes a re-timer engine to determine, using a fractional conversion ratio between the first sample rate and a crystal oscillator (XO)-integer-divided sample rate, a plurality of re-timer values comprising differences between pulses of a pseudo clock corresponding to the XO-integer-divided sample rate and closest corresponding pulses of a clock corresponding to the first sample rate. The resampler circuit may further include a time shifting circuit to re-sample data values of the sampled stream of data associated with locations of the plurality of re-timer values. In these embodiments, a correlation circuit that is coupled to the resampler circuit may be adapted to use the re-sampled data values, the pseudo clock, and the plurality of re-timer values to match an expected data pattern to a corresponding data pattern detected in a frame delimiter of the packet. Additional implementation details will be discussed with reference to the current Figures.

The present disclosure includes a number of advantages, as the correlation circuit may be enhanced to still perform the correlation associated with frame synch detection, despite the fact that the data is not actually resampled at the XO-integer-divided sample rate. Instead, as will be explained in more detail, the pseudo clock with the resampled data may be used to correlate the re-sampled data values to the timing of the LO sample rate. In some embodiments, the pseudo clock is generated by removing (e.g., swallowing) occasional pulses from a faster LO-divided sample rate that closely corresponds with a pulse of the XO-divided clock. By retaining these precise re-timer values, the correlation circuit may more precisely correlate a peak of the incoming data (which is not fully resampled at an XO-integer-divided sample rate) to that of the expected data pattern. For example, the correlation circuit 148 may detect a peak in an incoming data pattern, locate a clock edge or re-timer value associated with the peak, and use this re-timer value (associated with the peak) to match the expected data pattern. In this way, precise timing associated with the LO-divided sample rate is retained while later correlation for peak detection is performed using the XO-divided pseudo data rate. Further, the receiver can operate at a non-integer sample rate (e.g., non-XO-integer-divided sample rate) and avoid the radio interference issues discussed previously.

FIG. 1A is a block diagram of a system 100 useable for frame synch detection with rate adaptation between a wireless device 101 acting as a CD and a wireless device 150 acting as a PD according to with an example embodiment. The system 100 may include a secured enclosure 50, e.g., that is secured using a lock mechanism 60, where a wireless device is adapted to gain access to the secured enclosure via the lock mechanism 60. The secured enclosure 50 may be, for example, a vehicle, a building, a residence, a garage, a shed, a vault, or the like. The secured enclosure 50 may also be a computer system, industrial equipment, or other items requiring secured access via the lock mechanism 60, which may be a digital locking mechanism, for example. In some embodiments, the lock mechanism 60 is integrated together with the wireless device 101.

In various embodiments, the wireless device 150 is any one of multiple peripheral wireless devices PD1 150A . . . PDN 150N, as the wireless device 101 may be adapted to communicate with any or all of the peripheral wireless devices PD1 150A . . . PDN 150N. In differing embodiments, the wireless device 150 is a mobile device such as a mobile phone, a smart phone, a pager, an electronic transceiver, a tablet, or the like. In these embodiments, the wireless device 150 may be adapted to gain access to the secured enclosure 50 by transmitting data including a frame delimiter and an enclosed frame.

In at least some embodiments, the wireless device 101 includes, but is not be limited to, a transmitter 102 or TX (e.g., a PAN transmitter), a receiver 104 or RX (e.g., a PAN receiver), a communications interface 106, one or more antenna 110, a memory 114, one or more input/output (I/O) devices 118 (such as a display screen, a touch screen, a keypad, and the like), and a processor 120. These components may all be coupled to a communications bus 130.

In some embodiments, a separate antenna is employed for each of the transmitter 102 and receiver 104, and so the antenna 110 is illustrated for simplicity. In at least some embodiments, the memory 114 may include storage to store instructions executable by the processor 120 and/or data generated by the communication interface 106. In various embodiments, the one or more antenna (such as the antenna 110) described herein within various devices may be used for PAN-based frequency bands, e.g., Bluetooth® (BT), BLE, Wi-Fi®, Zigbee®, Z-Wave™, and the like.

In some embodiments, the communications interface 106 is integrated with the transmitter 102 and the receiver 104, e.g., as a frontend of the wireless device 101. The communication interface 106 may coordinate, as directed by the processor 120, to request/receive packets from the peripheral wireless device 150. The communications interface 106 may further process data symbols received by the receiver 104 in a way that the processor 120 can perform further processing, to include verifying correlation between phase-based samples of data values obtained from a frame of a packet and an expected data pattern as part of a security protocol, as discussed herein.

Figure 1B:
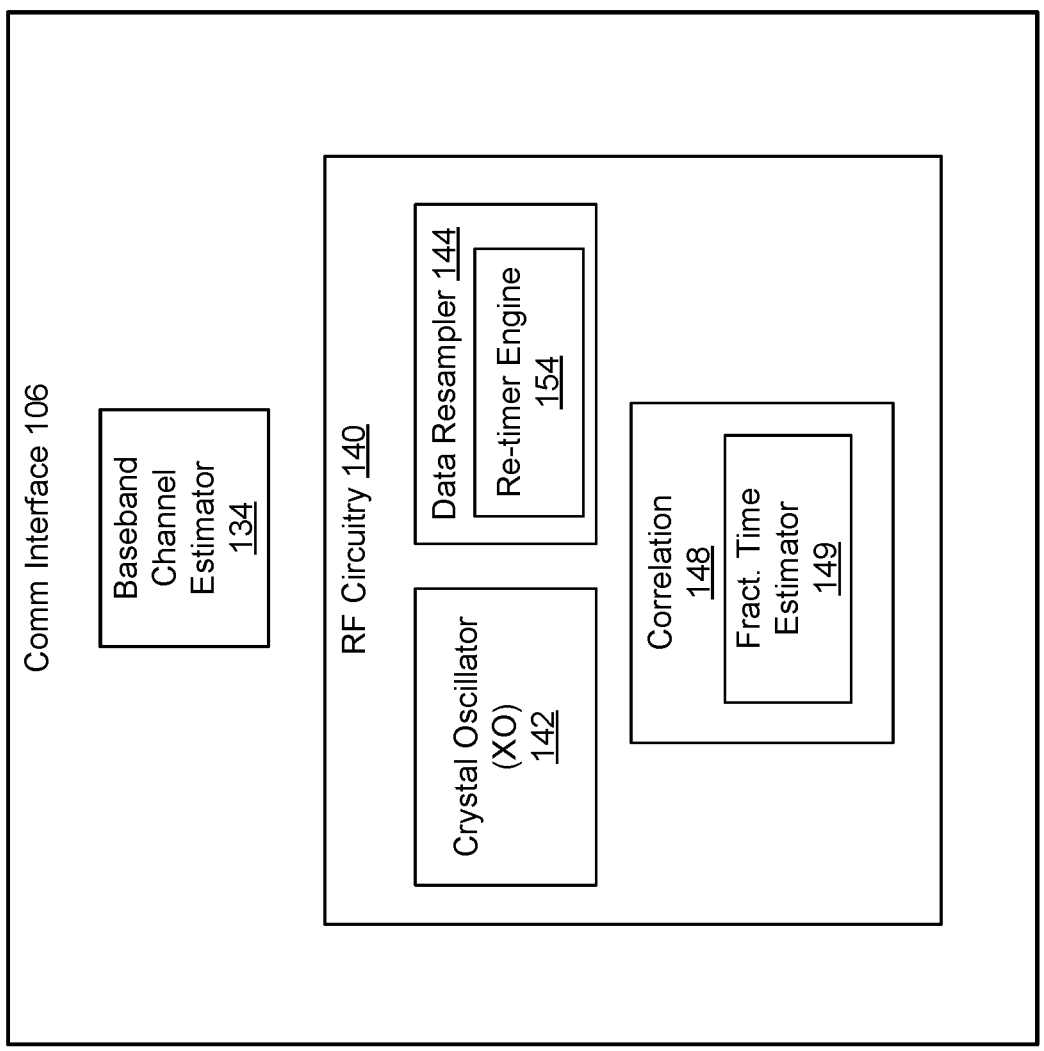
FIG. 1B is a simplified block diagram of the communication interface of the CD-based wireless device of FIG. 1A according to at least one embodiment.

FIG. 1B is a simplified block diagram of the communication interface 106 of the wireless device 101 of FIG. 1A according to at least one embodiment. In at least some embodiments, the communication interface 106 includes a baseband channel estimator 134 used to estimate, and thus detect, a channel and enable the receiver 104 to receive packets over the channel Estimating a channel may, for example, refer to estimating channel state information (CSI) and a received signal strength indicator (RSSI) for each channel. The CSI may include a detailed channel impulse response (e.g., containing channel properties) with both amplitude and phase information. The receiver 104 may adjust the rate of sampling channel properties by the baseband channel estimator 134. Thus, the receiver 104 or the baseband channel estimator 134 may include a local oscillator (LO) that samples at particular sampling rates for particular channels, which is often at a non-integer multiple of the sample rate.

In various embodiments, the communication interface 106 includes RF circuitry 140, although the RF circuitry 140 discussed herein may also be coupled with the communication interface 106 and thus be located elsewhere within the frontend of the wireless device 101. In at least some embodiments, the RF circuitry 140 includes (or is coupled with) a crystal oscillator (XO) 142 and includes a data resampler circuit 144 and a correlation circuit 148. The data resampler circuit 144 may include a re-timer engine 154 to generate (or cause generation of) the re-timer values that will be used by the correlation circuit 148 to perform frame synch detection. The correlation circuit 148 may also include a fractional time estimator 149.

The XO 142 may provide a clock to govern sampling and processing in an XO-based design, but direct conversion of data in the XO-based frequency domain carries the disadvantages that were previously discussed. In some embodiments, the RF circuitry is implemented as a programmable processor, such as an application-specific integrated circuit (ASIC), field programmable gate array (FPGA), a processing unit (such as a CPU or a GPU), or other microprocessor device that may include a combination of circuit-based hardware, logic, firmware, and/or software.

In various embodiments, the data resampler circuit 144 is configured to resample input data, which has already been sampled by the receiver 104 at the LO frequency-derived sample rate, to an XO frequency-derived pseudo sample rate. This XO frequency-derived pseudo sample rate may be governed by a pseudo clock that is generated to, on average, correspond to an XO-integer-divided frequency, such as 4 MHz, 6 MHz, 12 MHz, 24 MHz, or the like. The correlation circuit 148 may use the pseudo clock to match an expected data pattern to a corresponding data pattern detected in a frame delimiter of the packet, e.g., by way of frame synch detection.

Figure 2:
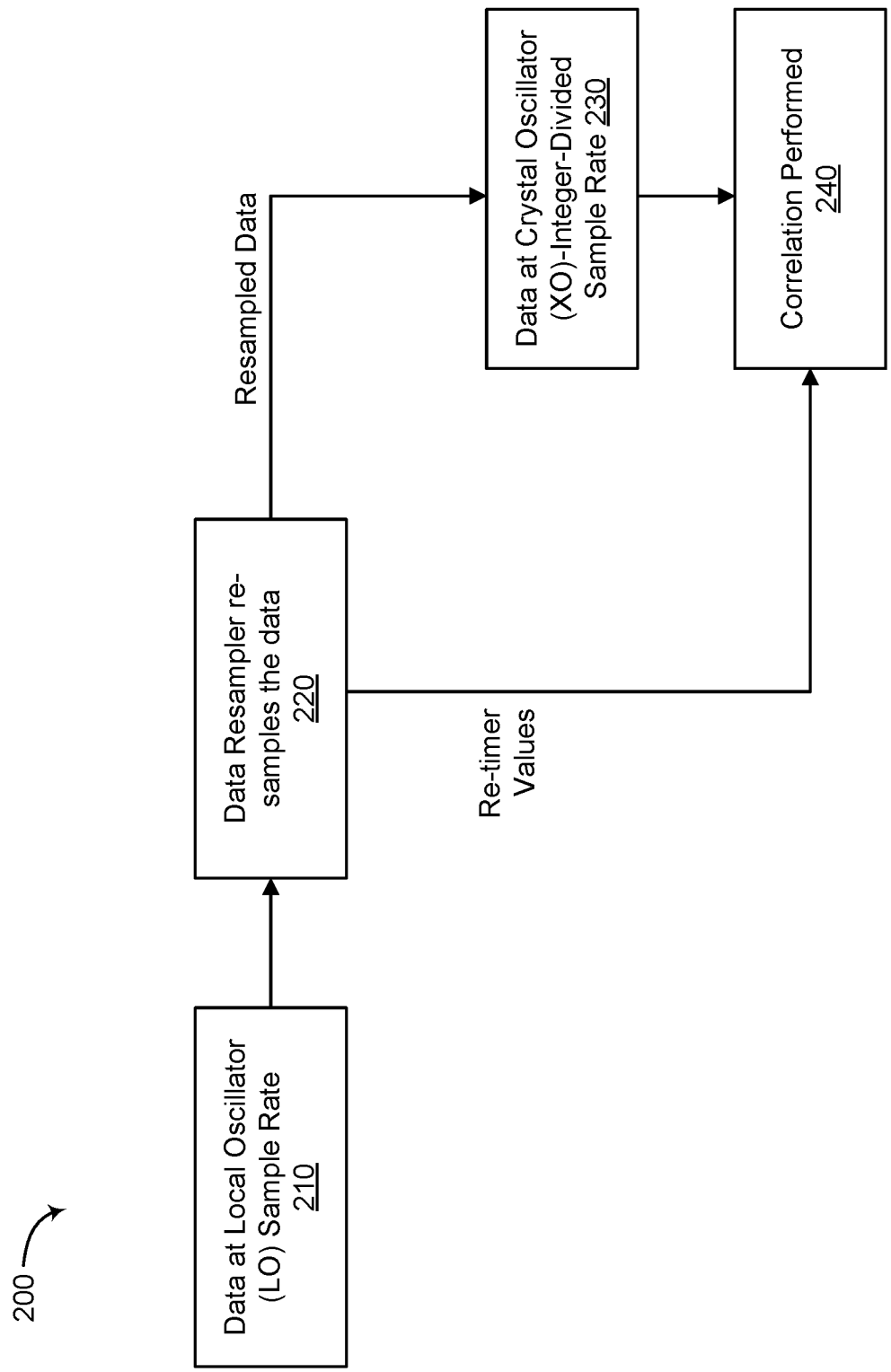
FIG. 2 is a flow diagram of a method of frame synch detection with rate adaptation according to at least one embodiment.

FIG. 2 is a flow diagram of a method 200 of frame synch detection with rate adaptation according to at least one embodiment. The method 200 may be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the communication interface 106 and potentially by a combination of the communication interface 106 and the processor 120.

At operation 210, data of a packet is sampled at a local oscillator (LO) sample rate specific to a channel estimated as was discussed with reference to FIGS. 1A-1B. This LO sample rate is not specific to any XO integer-divided frequency. Just as an example for purposes of explanation, assume the LO sample rate is 6.42 MHz.

Figure 4:
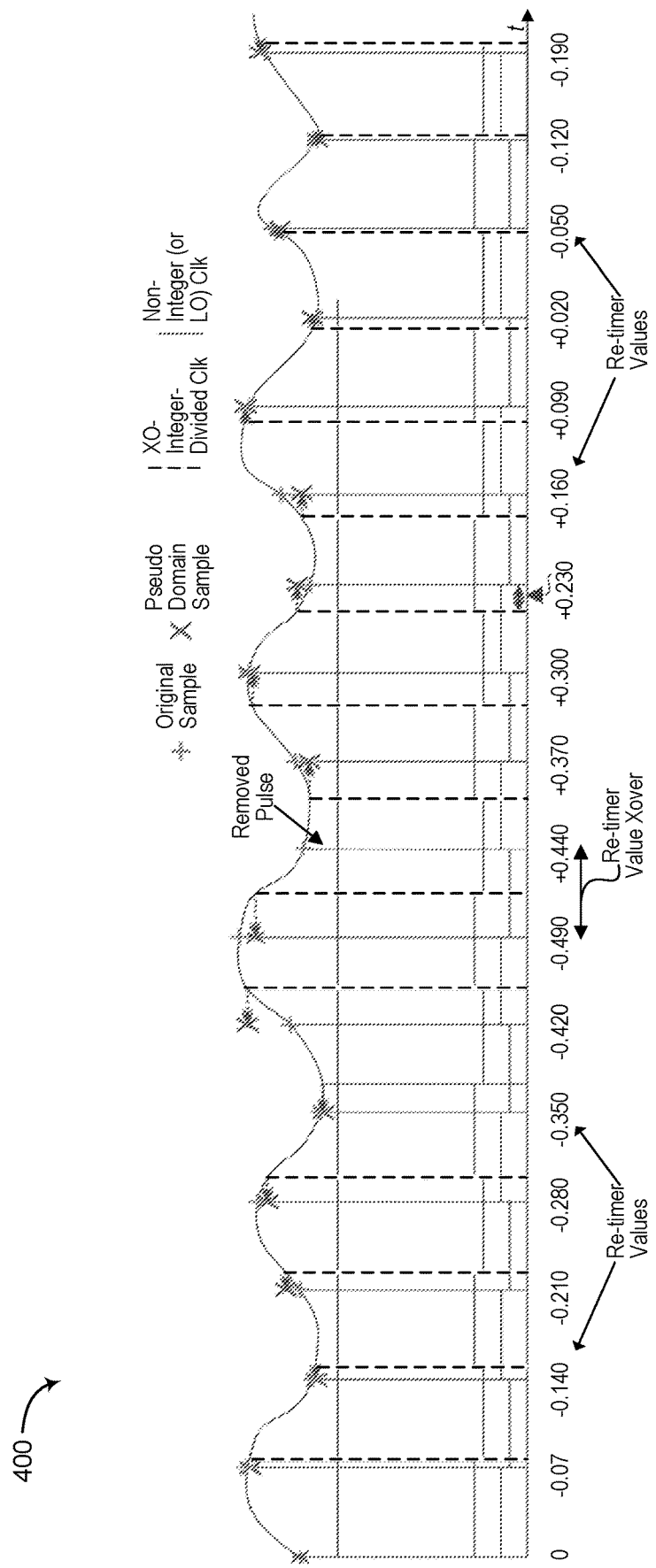
FIG. 4 is a graph illustrating retiming between a crystal oscillator (XO)-divided sample rate and a local-oscillator (LO)-based sample rate in at least one embodiment.

At operation 220, the data resampler circuit 144 resamples the data in a way to increase (interpolation) or decrease (decimation) the data sample rate. The sample rate of the data output from the data resampler circuit 144 can then be, on average, an XO-integer-divided sample rate, thus corresponding to a "pseudo" clock at an XO-integer-divided frequency. Just an example for purposes of explanation, assume the XO-integer-divided sample rate is 6.0 MHz, thus slightly slower than the LO-divided sample rate. FIG. 4, which is discussed in more detail later, illustrates both a non-integer clock corresponding to the LO divided sample rate and an XO-integer-divided clock corresponding to the XO-integer-divided sample rate.

At operation 220, the data resampler circuit 144 (e.g., the re-timer engine 154) may also determine re-timer values using a fractional rate between the LO-divided sample rate and the XO-integer-divided sample rate, e.g., as a difference between pulses of the pseudo clock corresponding to the XO-integer-divided sample rate and closest corresponding pulses of a clock corresponding to the LO divided sample rate. These re-timer values may be provided to the correlation circuit 148.

Also at operation 220, the data resampler circuit 144 may re-sample data values of the sampled stream of data associated with locations of the re-timer values, and also provide these re-sampled data values to the correlation circuit 148. The functioning of the data resampler circuit 144, to include generation of the pseudo clock, will be described in more detail.

At operation 230, the data (e.g., re-sampled data values) at the XO-integer-divided sample rate is provided to the correlation circuit 148.

At operation 240, a correlation is performed, by the correlation circuit 148, between a data pattern within a frame delimiter of the packet and an expected data pattern from a trusted peripheral device (PD). More specifically, the correlation circuit 148 may use the re-sampled data values, the pseudo clock, and the re-timer values to match an expected data pattern to a corresponding data pattern detected in the frame delimiter. Further, in at least some embodiments, the fractional time estimator 149 to further establish the time of arrival (ToA) of the frame delimiter. The resolution of the fractional time is typically much better than a period of the clock, which in this case, is the average period of the pseudo clock.

Figure 3A:
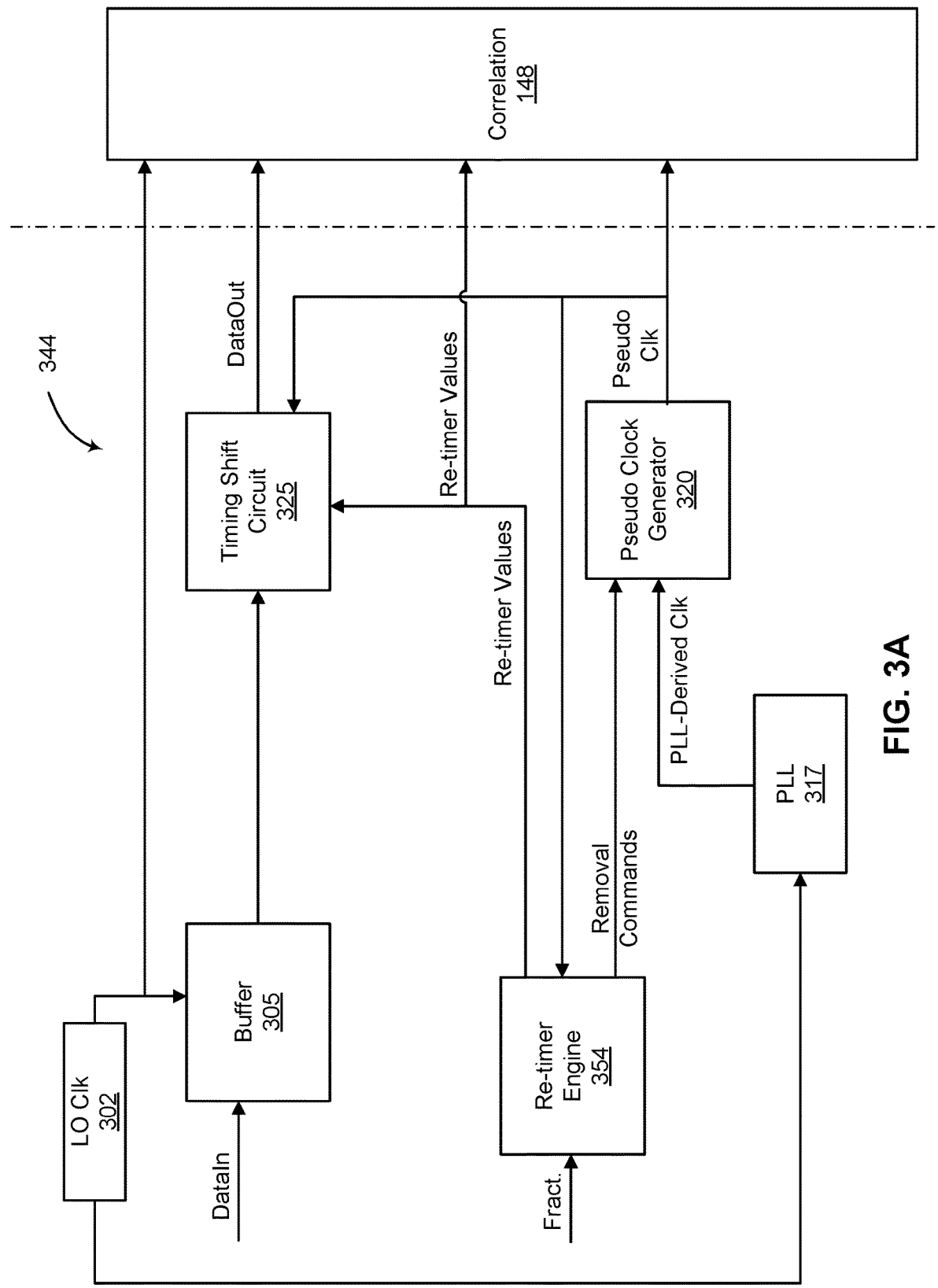
FIG. 3A is a block diagram of a data resampler circuit of a CD according to at least one embodiment.

FIG. 3A is a block diagram of a data resampler circuit 344 of a CD according to at least one embodiment. FIG. 4 is a graph illustrating retiming between a crystal oscillator (XO)-divided sample rate and a local-oscillator (LO)-based sample rate in at least one embodiment, which will also be referenced. Timing and data generated by the data resampler circuit 344 may be provided to the correlation circuit 148 (FIG. 2B). In at least one embodiment, the data resampler circuit 344 is the data resampler circuit 144 of FIG. 2B.

In at least some embodiments, the data resampler circuit 344 includes an LO clock 302, a buffer 305, a phase-locked loop (PLL) 317, a pseudo clock generator 320, a time shifting circuit 325, and a re-timer engine 354. In some embodiments, the PLL 317 is located elsewhere in the communication interface 106 or frontend of the wireless device 101, e.g., need not be integrated within the data resampler circuit 344. In at least one embodiment, the re-timer engine 354 is the re-timer engine 154 of FIG. 2B.

In various embodiments, the buffer 305 includes a delay line to sample the input data (e.g., sampled stream of data from the receiver 104) using an LO-integer-divided clock 302, which is compatible with the frequency of the local oscillator (LO) used by the receiver 104. In these embodiments, the buffer 305 outputs the data in a delayed sampled data stream corresponding to a first frequency derived from the LO by a simple integer divider, which as was discussed, may be specific to the channel that is estimated over which the packet is received. This delaying and further sampling enable the other components to generate different timing and data values that correspond to the subsequent sampled stream, as will be explained. FIG. 4 illustrates a curve associated with a non-integer clock that corresponds to the LO-integer-divided sample rate and the plus signs (+) mark original samples that have been preserved from the sampling performed by the receiver 104.

In at least some embodiments, the re-timer engine 354 tracks the timing relationship of the data between the input sampling rate (of the incoming data) and the XO-integer-divided sample rate. Using the example from before, the fractional rate is the fractional difference between 6.42 Msps and 6.00 Msps, which is −0.0660, e.g., the distance between the first two samples in the graph of FIG. 4. The re-timer engine 354 may then use this fractional rate to determine multiple re-timer values that are a difference between pulses of a pseudo clock corresponding to the XO-integer-divided sample rate and closest corresponding pulses of a clock corresponding to the subsequent sample rate, e.g., the LO clock 302. For purposes of explanation according to the example of FIG. 4, the re-timer values are the abscissa numbers (along the x-axis of the graph) corresponding to the sample locations in the subsequent sampled stream. In some embodiments, the re-timer values can be understood to be clock edges adapted from the LO clock 302, but without the removed (or swallowed) pulses. The re-timer values may thus estimate the time shift or time interpolation the sampled data at the first sample rate is required to have to output data at the XO-integer-divided sample rate. In the graph of FIG. 4, the re-timer values are rounded off for simplicity, but in reality, may be retained to many (e.g., up to 12) decimal places. In these embodiments, the re-timer engine 354 provides the re-timer values to the timing shift circuit 325, which re-timer values are discussed later as being equivalent to fractional interpolation commands to the timing shift circuit 325.

In some embodiments, the pseudo clock generator 320 is adapted to generate the pseudo clock referred to previously. The PLL 317 may, for example, generate a PLL clock that is derived based on the LO clock 302. The PLL 317 may be adapted to use the LO clock 302 as an input reference onto which the PLL 317 locks in frequency and phase, to provide as accurate a PLL-based clock as possible at the non-integer sample rate.

In these embodiments, the pseudo clock generator 320 receives the LO-integer-divided clock and removes (e.g., swallows) a pulse from the LO-integer-divided clock in response to each removal command from the re-timer engine 354, which will be discussed shortly. In these embodiments, the pseudo clock generator 320 further generates the pseudo clock as the PLL clock with the removed pulses (or swallowed pulses as described in the art), the pseudo clock corresponding to, on average, the XO-integer-divided sample rate.

In at least some embodiments, the re-timer engine 354 also detects a re-timer value of the multiple re-timer values that satisfies (e.g., at least meets or surpasses) a threshold value, e.g., which indicates that there is a cross-over between sequential re-timer values of approximately an integer value (e.g., a one value ("1")) minus the fractional rate value. In response to such a detection, the re-timer engine 354 can trigger a removal command (e.g., a pulse-swallowing command) to the pseudo clock generator 320. As illustrated in FIG. 4, there is a re-timer value crossover between −0.490 and +0.440, indicating a jump by almost a positive one.

Figure 3B:
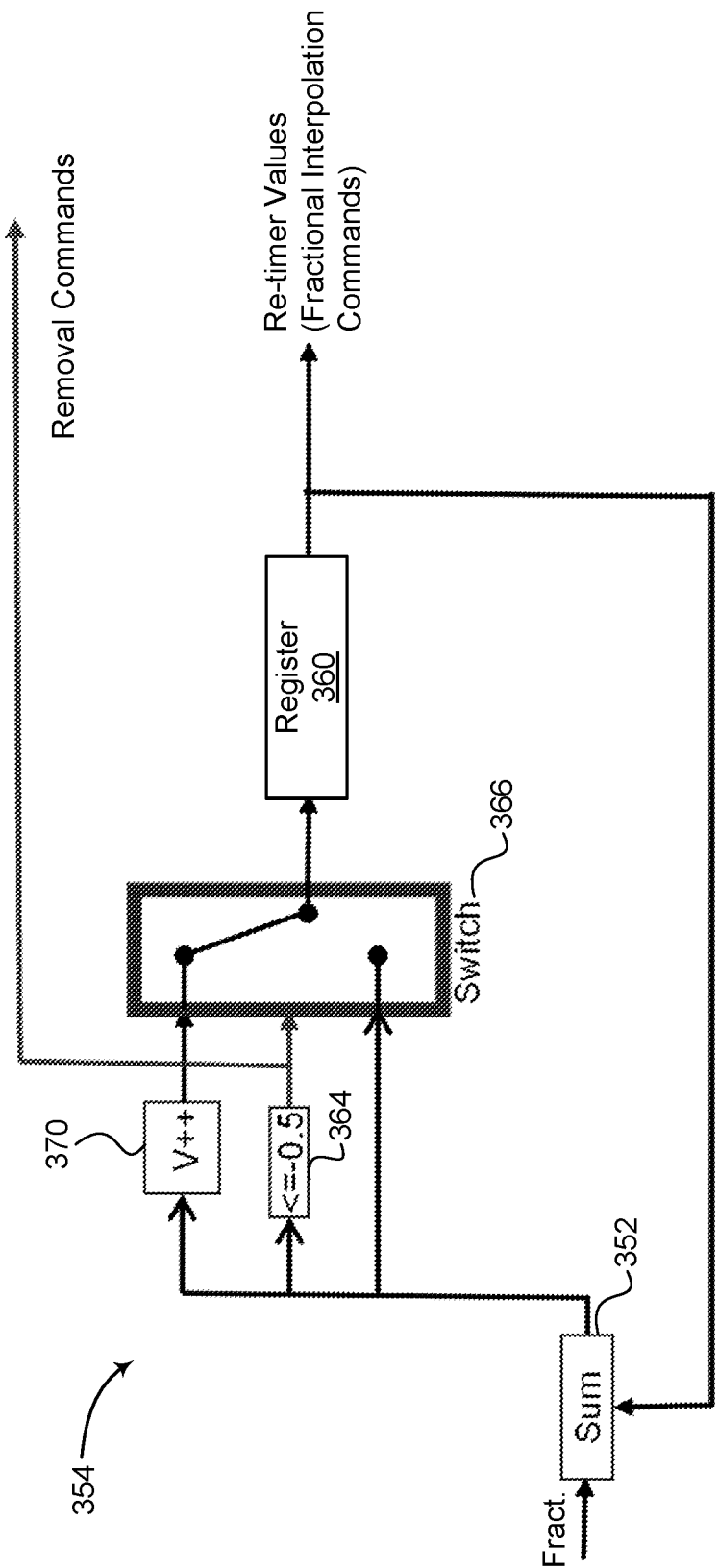
FIG. 3B is a block diagram of a re-timer engine of the data resampler circuit according to at least one embodiment.

More specifically, FIG. 3B is a block diagram of the re-timer engine 354 of the data resampler circuit 344 according to at least one embodiment. In this at least one embodiment, the re-timer engine 354 includes a register 360 to store a re-timer value of the multiple re-timer values. In some embodiments, the register 360 can buffer multiple re-timer values. The re-timer engine 354 may further include a summer 352 to add the fractional conversion ratio to the re-timer value to determine a fractional re-timer value. The re-timer engine 354 may further include a comparator 364 to compare the fractional retimer value to a predetermined negative decimal value, e.g., −0.5 by way of example, although others like −0.4 or −0.6 are also envisioned. If employing a −0.5 as the predetermined negative decimal value, the re-timer values may swing between −0.5 and +0.5 (see FIG. 4). The re-timer engine 354 may further include a switch 366 configured to cause a one value ("1") to be added to the fractional re-timer value to generate a positive re-timer value in response to the fractional re-timer value becoming less than or equal to the predetermined negative decimal value. A voltage source 370 such as a charge pump may also be included to perform the addition of the one value. In these embodiments, the comparator 364 is also configured to trigger a removal command to the pseudo clock generator 320 in response to the one value being added, e.g., in response to the fractional re-timer value becoming less than or equal to the predetermined negative decimal value.

With additional reference to FIG. 3A, in various embodiments, the timing shift circuit 325 is configured to re-sample data values (e.g., via interpolation or decimation) of the incoming sampled stream of data based on re-timer commands, e.g., re-timer values, which function as fractional interpolation commands. To perform this function, the timing shift circuit 325 may receive the retiming values from the re-timer engine 354 and the pseudo clock from the pseudo clock generator 320. As illustrated in FIG. 4, the dashed lines correspond to sample locations (e.g., pulses) of the pseudo clock, which is on average at an XO-integer-divided sample rate, provided by the pseudo clock generator 320. The "X" locations can be understood as the re-sampled data values that the timing shift circuit 325 has determined at one of the pulses (or clock edges) of the sampled stream of data (having the first sample rate) from a closest corresponding location (or pulse) of the pseudo clock (see horizontal interpolation lines to the X location). In some embodiments, the timing shift circuit 325 includes multiple digital fractional delay filters that re-sample (or interpolate), using the pseudo clock, the data values based on corresponding ones of the multiple re-timer values. Each fractional delay filter may employ one or more Farrow structures, for example.

Figure 5:
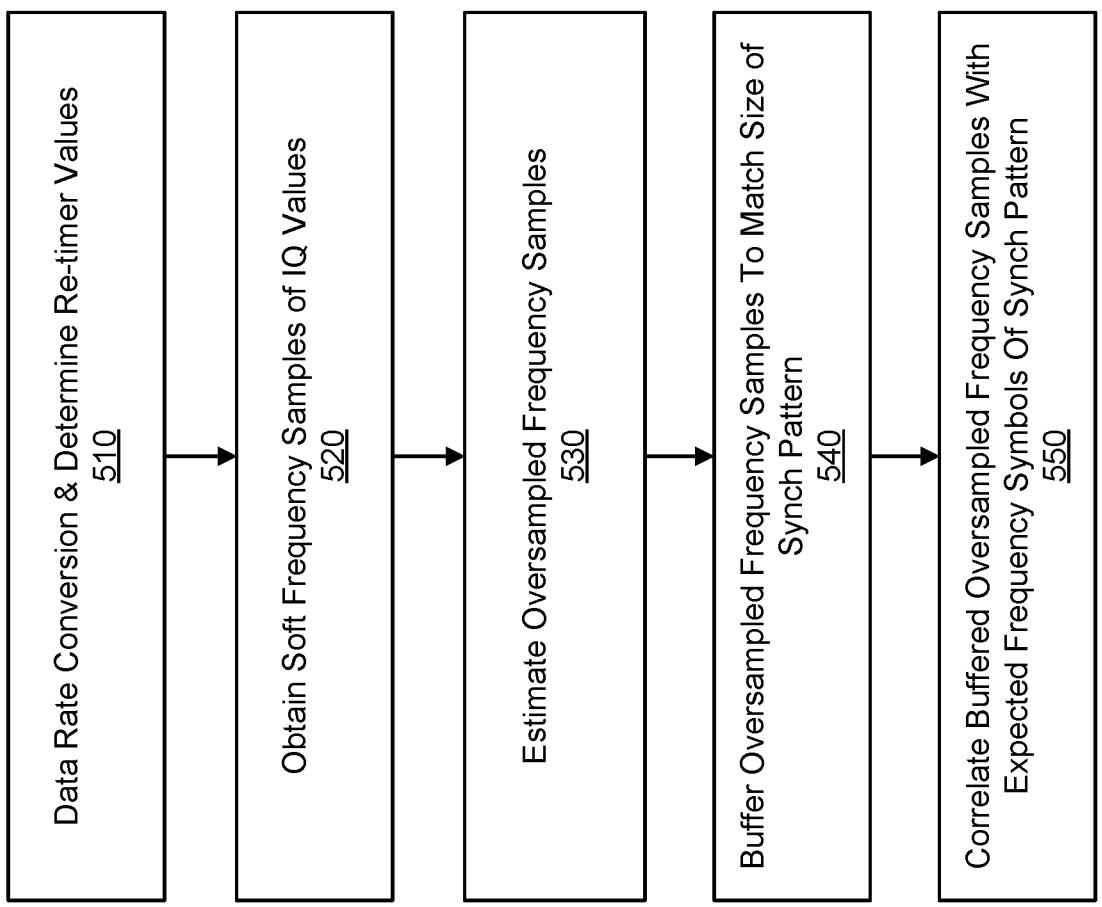
FIG. 5 is a flow diagram of a method of frame synch detection with rate adaptation according to various embodiments.

FIG. 5 is a flow diagram of a method 500 of frame synch detection with rate adaptation according to various embodiments. The method 500 may be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the RF circuitry 140 and potentially by a combination of the communication interface 106 and the processor 120 (FIG. 1B).

At operation 510, the processing logic performs data rate conversion and determines re-timer values. More specifically, the data resampler 144 may determine the fractional conversion ratio between the first sample rate (e.g., corresponding to the LO clock 302) of the sampled data stream and the XO-integer-divided sample rate. In the example of FIG. 4, this was explained as being a −0.0660 (which is −0.07 as a rounded number) only by way of example. The processing logic (e.g., the re-timer engine 354) may further determine multiple re-timer values that include differences between pulses of a pseudo clock corresponding to the XO-integer-divided sample rate and closest corresponding pulses of a clock corresponding to the first sample rate, which are illustrated in FIG. 4 by way of example.

At operation 520, the processing logic obtains soft frequency samples based on in-phase and quadrature (IQ) values of re-sampled data values. The soft frequency samples may capture symbols that are frequency deviations within the sampled data values and which have yet to be resolved as a 1 or a 0 bit, for example. More specifically, the time shifting circuit 325 (or similar logic) may re-sample data values of the sampled data stream associated with locations of the multiple re-timer values. In some embodiments, a delay line of the buffer 305 may convert, to phase, a set of de-rotated in-phase and quadrature (IQ) inputs of the sampled data stream to generate a set of phase samples and determine a difference in phase between adjacent phase samples of a plurality of phase samples of a first data symbol. The processing logic may further subtract, to generate multiple inter-symbol differences, each difference in phase of the first data symbol from a corresponding difference in phase of a second data symbol that is adjacent to the first data symbol. The processing logic may further accumulate, as the soft frequency samples, the multiple inter-symbol differences across multiple sequentially-sampled symbols respective to the first data symbol.

At operation 530, the processing logic may estimate oversampled frequency samples of the soft frequency samples at a multiple of a symbol rate of the pseudo clock, e.g., to convert the soft samples to a domain of the pseudo clock. In some embodiments, the multiple of the symbol rate may be 2 times, 4 times, 6 times, 8 times, or the like, the symbol rate of the pseudo clock.

At operation 540, the processing logic may buffer the oversampled frequency samples into a fixed number of symbols equal to those of a frame synch pattern of the frame delimiter. In some embodiments, the frame synch pattern is 32 symbols and thus 32×6 total equidistant samples may be buffered to be used to correlate against the expected data pattern of the frame delimiter if operating at a 6 times multiple of the pseudo clock. While 32 symbols is suggested as an example, other numbers of symbols are envisioned.

At operation 550, the processing logic (e.g., the correlation circuit 148 of FIG. 1B and FIG. 3A) may correlate the buffered oversampled frequency samples with expected frequency symbols of the expected data pattern to detect a correlation peak. For example, in some embodiments, the processing logic detects a peak within the re-sampled data values that is within a threshold value of a corresponding peak of the expected data pattern according to a mathematical operation involving multiplies and adds. The processing logic may further determine a re-timer value of the multiple re-timer values most closely corresponding in time to the detected peak. In some embodiments, the processing logic further corrects a location of the peak using at least the re-timer value and correlates (to including matches) the peak at the corrected location with the corresponding peak.

In some embodiments, to correct the location of the peak, the processing logic determines a numerical fractional value associated with a period of the pseudo clock. The processing logic may further determine a re-timer fractional value corresponding to an edge of the detected peak using the clock and based on the re-timer value. The processing logic may further combine the numerical fractional value and the re-timer fractional value with the location to generate the corrected location of the peak. In this context, the location refers to a timing event that is demarked by an edge of the pseudo clock.

In various embodiments, if the peak at the corrected location satisfies a second threshold value (e.g., that is closer compared to the first threshold value) or the sampled data is fit to a peak of the curve of the expected data pattern within a predetermined fractional resolution, the processing logic may create a synch found event and store the re-timer value corresponding to the corrected peak location in relation to the synch found event. The fractional part of the correlation may be obtained by fitting a function to the value of the corrected peak and to the two adjacent sample values of the sampled data stream. Additionally, or alternatively, other logic, circuits, and/or algorithms may be employed to improve the precise location determined for the peak.

Figure 6:
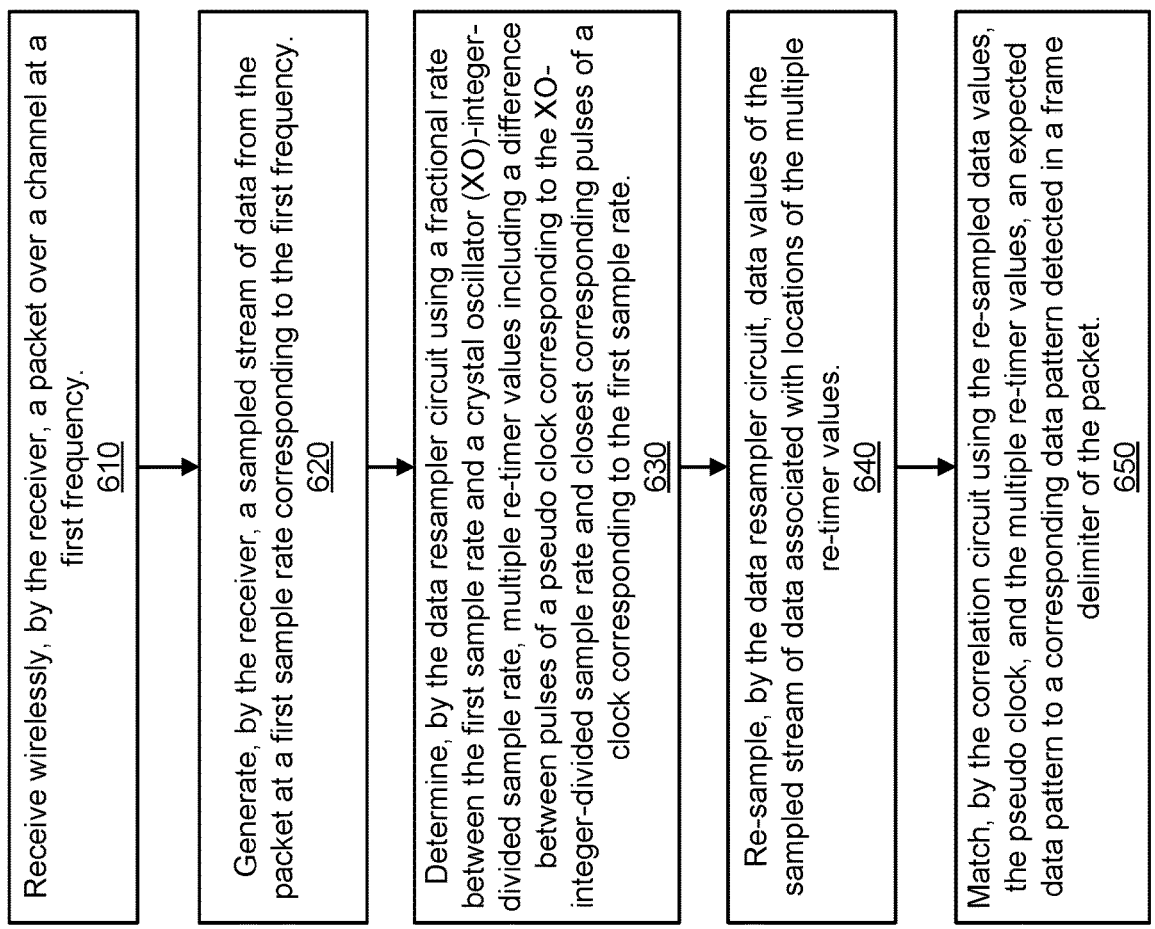
FIG. 6 is a flow diagram of a method of frame synch detection with rate adaptation according to at least one embodiment.

FIG. 6 is a flow diagram of a method of frame synch detection with rate adaptation according to at least one embodiment. The method 600 may be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the RF circuitry 140 and potentially by a combination of the communication interface 106 and the processor 120 (FIG. 1B).

At operation 610, the receiver 104 wirelessly receives a packet over a channel at a first frequency.

At operation 620, the receiver 104 generates a sampled stream of data from the packet at a first sample rate corresponding to the first frequency.

At operation 630, the processing logic (e.g., the data resampler circuit 344) determines, using a fractional rate between the first sample rate and a crystal oscillator (XO)-integer-divided sample rate, a plurality of re-timer values comprising a difference between pulses of a pseudo clock corresponding to the XO-integer-divided sample rate and closest corresponding pulses of a clock corresponding to the first sample rate.

At operation 640, the processing logic (e.g., the data resampler circuit 344) re-samples data values of the sampled stream of data associated with locations of the plurality of re-timer values.

At operation 650, the processing logic (e.g., the correlation circuit 148) matches, using the re-sampled data values, the pseudo clock, and the plurality of re-timer values, an expected data pattern to a corresponding data pattern detected in a frame delimiter of the packet.

It will be apparent to one skilled in the art that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Certain embodiments may be implemented by firmware instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for USB-C/PD mode-transition architecture described herein. The non-transitory computer-readable storage medium may include, but is not limited to, electromagnetic storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the disclosure has been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A wireless device comprising:
   a receiver to wirelessly receive a packet over a channel at a first frequency and generate a sampled stream of data from the packet at a first sample rate corresponding to the first frequency;
   a data resampler circuit coupled to the receiver, the data resampler circuit comprising:
     a re-timer engine to determine, using a fractional conversion ratio between the first sample rate and a crystal oscillator (XO)-integer-divided sample rate, a plurality of re-timer values comprising differences between pulses of a pseudo clock corresponding to the XO-integer-divided sample rate and closest corresponding pulses of a clock corresponding to the first sample rate; and
     a time shifting circuit to re-sample data values of the sampled stream of data associated with locations of the plurality of re-timer values; and
   a correlation circuit coupled to the data resampler circuit, the correlation circuit to use the re-sampled data values, the pseudo clock, and the plurality of re-timer values to match an expected data pattern to a corresponding data pattern detected in a frame delimiter of the packet.

2. The wireless device of claim 1, wherein the XO-integer-divided sample rate averages a fraction of a frequency of an integer-divided XO sample rate and the first sample rate is a non-integer sample rate specific to the channel.

3. The wireless device of claim 1, wherein the time shifting circuit comprises a plurality of digital fractional delay filters that re-sample, using the pseudo clock, the data values based on corresponding ones of the plurality of re-timer values.

4. The wireless device of claim 1, wherein the data resampler circuit further comprises a pseudo clock generator to generate the pseudo clock, the pseudo clock generator to:
   receive a phase-locked loop (PLL) clock that is derived based on the clock corresponding to the first sample rate;
   remove a pulse from the PLL clock in response to each removal command from the re-timer engine; and
   generate the pseudo clock comprising the PLL clock with the removed pulses, the pseudo clock corresponding to, on average, the XO-integer-divided sample rate.

5. The wireless device of claim 4, wherein the re-timer engine is further to:
   detect a re-timer value of the plurality of re-timer values that satisfies a threshold value; and
   in response to the detection, trigger a removal command to the pseudo clock generator.

6. The wireless device of claim 4, wherein the re-timer engine comprises:
   a register to store a re-timer value of the plurality of re-timer values;
   a summer to add the fractional conversion ratio to the re-timer value to determine a fractional re-timer value;

a comparator to compare the fractional re-timer value to a predetermined negative decimal value; and
a switch to cause a one value to be added to the fractional re-timer value to generate a positive re-timer value in response to the fractional re-timer value becoming less than or equal to the predetermined negative decimal value; and
wherein the comparator is to trigger a removal command to the pseudo clock generator in response to the one value being added.

7. The wireless device of claim 1, wherein the correlation circuit is further to:
detect a peak within the re-sampled data values that is within a threshold value of a corresponding peak of the expected data pattern;
determine a re-timer value of the plurality of re-timer values most closely corresponding in time to the detected peak;
correct a location of the peak using at least the re-timer value; and
correlate the peak at the corrected location with the corresponding peak.

8. The wireless device of claim 7, wherein, to correct the location of the peak, the correlation circuit is to:
determine a numerical fractional value associated with a period of the pseudo clock;
determine a re-timer fractional value corresponding to an edge of the detected peak using the clock and based on the re-timer value; and
combine the numerical fractional value and the re-timer fractional value with the location to generate the corrected location of the peak.

9. The wireless device of claim 1, wherein
the data resampler circuit is further to:
obtain, based on in-phase and quadrature values of the re-sampled data values, soft frequency samples;
estimate oversampled frequency samples of the soft frequency samples at a multiple of a symbol rate of the pseudo clock; and
buffer the oversampled frequency samples into a fixed number of symbols equal to those of a frame synch pattern of the frame delimiter; and
the correlation circuit is further to correlate the buffered oversampled frequency samples with expected frequency symbols of the expected data pattern to detect a correlation peak.

10. A method of operating a wireless device that comprises a receiver, a data resampler circuit coupled to the receiver, and a correlation circuit coupled to the data resampler circuit, wherein the method of operating the wireless device comprises:
receiving wirelessly, by the receiver, a packet over a channel at a first frequency;
generating, by the receiver, a sampled stream of data from the packet at a first sample rate corresponding to the first frequency;
determining, by the data resampler circuit using a fractional conversion ratio between the first sample rate and a crystal oscillator (XO)-integer-divided sample rate, a plurality of re-timer values comprising differences between pulses of a pseudo clock corresponding to the XO-integer-divided sample rate and closest corresponding pulses of a clock corresponding to the first sample rate;
re-sampling, by the data resampler circuit, data values of the sampled stream of data associated with locations of the plurality of re-timer values; and matching, by the correlation circuit using the re-sampled data values, the pseudo clock, and the plurality of re-timer values, an expected data pattern to a corresponding data pattern detected in a frame delimiter of the packet.

11. The method of claim 10, wherein the XO-integer-divided sample rate averages a fraction of a frequency of an integer-divided XO sample rate and the first sample rate is a non-integer sample rate specific to the channel.

12. The method of claim 10, wherein the method of operating the wireless device further comprises employing a plurality of fractional delay filters that re-sample, using the pseudo clock, the data values based on corresponding ones of the plurality of re-timer values.

13. The method of claim 10, wherein the method of operating the wireless device further comprises:
receiving, by the data resampler circuit, a phase-locked loop (PLL) clock that is derived based on the clock corresponding to the first sample rate;
removing a pulse from the PLL clock in response to each removal command received from a re-timer engine; and
generating, by the data resampler circuit, the pseudo clock comprising the PLL clock with the removed pulses, wherein the pseudo clock corresponds to, on average, the XO-integer-divided sample rate.

14. The method of claim 13, wherein the method of operating the wireless device further comprises:
detecting a re-timer value of the plurality of re-timer values that satisfies a threshold value; and
triggering, by the re-timer engine, a removal command in response to the detecting.

15. The method of claim 13, wherein the method of operating the wireless device further comprises:
storing a re-timer value of the plural of re-timer values in a register;
adding, with a summer, to determine a fractional re-timer value, the fractional conversion ratio to the re-timer value;
comparing, with a comparator, the fractional re-timer value to a predetermined negative decimal value;
causing, using a switch, a one value to be added to the fractional re-timer value to generate a positive re-timer value in response to the fractional re-timer value becoming less than or equal to the predetermined negative decimal value; and
triggering, by the comparator, a removal command in response to the one value being added.

16. The method of claim 10, wherein the method of operating the wireless device further comprises:
detecting, by the correlation circuit, a peak within the re-sampled data values that is within a threshold value of a corresponding peak of the expected data pattern;
determining a re-timer value of the plurality of re-timer values most closely corresponding in time to the detected peak;
correcting a location of the peak using at least the re-timer value; and
correlating, by the correlation circuit, the peak at the corrected location with the corresponding peak.

17. The method of claim 16, wherein correcting the location of the peak comprises:
determining a numerical fractional value associated with a period of the pseudo clock;
determining a re-timer fractional value corresponding to an edge of the detected peak using the clock and based on the re-timer value; and combining the numerical fractional value and the re-timer fractional value with the location to generate the corrected location of the peak.

18. The method of claim 10, wherein the method of operating the wireless device further comprises:
obtaining, based on in-phase and quadrature values of the re-sampled data values, soft frequency samples;
estimating oversampled frequency samples of the soft frequency samples at a multiple of a symbol rate of the pseudo clock;
buffering the oversampled frequency samples into a fixed number of symbols equal to those of a frame synch pattern of the frame delimiter; and
correlating the buffered oversampled frequency samples with expected frequency symbols of the expected data pattern to detect a correlation peak.

19. A system comprising:
a first wireless device adapted to gain access to a secured enclosure by transmitting data comprising a frame delimiter; and
a second wireless device located within the secured enclosure, the second wireless device comprising:
a receiver to wirelessly receive a packet over a channel at a first frequency and generate a sampled stream of data from the packet at a first sample rate corresponding to the first frequency;
a data resampler circuit coupled to the receiver, the data resampler circuit comprising:
a re-timer engine to determine, using a fractional rate between the first sample rate and a crystal oscillator (XO)-integer-divided sample rate, a plurality of re-timer values comprising differences between pulses of a pseudo clock corresponding to the XO-integer-divided sample rate and closest corresponding pulses of a clock corresponding to the first sample rate; and
a time shifting circuit to re-sample data values of the sampled stream of data associated with locations of the plurality of re-timer values; and
a correlation circuit coupled to the data resampler circuit, the correlation circuit to use the re-sampled data values, the pseudo clock, and the plurality of re-timer values to match an expected data pattern to a corresponding data pattern detected in a frame delimiter of the packet.

20. The system of claim 19, wherein the XO-integer-divided sample rate averages a fraction of a frequency of an integer-divided XO sample rate and the first sample rate is a non-integer sample rate specific to the channel.

* * * * *